United States Patent
Cheng et al.

(10) Patent No.: US 9,445,380 B2
(45) Date of Patent: Sep. 13, 2016

(54) METHOD AND APPARATUS FOR POWER CONTROL AND INTERFERENCE COORDINATION

(75) Inventors: Fang-Chen Cheng, Randolph, NJ (US); Said Tatesh, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 1610 days.

(21) Appl. No.: 12/766,031

(22) Filed: Apr. 23, 2010

(65) Prior Publication Data

US 2010/0272009 A1 Oct. 28, 2010

Related U.S. Application Data

(60) Provisional application No. 61/214,508, filed on Apr. 24, 2009.

(51) Int. Cl.
| H04W 52/36 | (2009.01) |
| H04W 52/34 | (2009.01) |
| H04W 52/46 | (2009.01) |
| H04W 52/32 | (2009.01) |
| H04W 52/48 | (2009.01) |

(52) U.S. Cl.
CPC ......... *H04W 52/346* (2013.01); *H04W 52/367* (2013.01); *H04W 52/46* (2013.01); *H04W 52/322* (2013.01); *H04W 52/48* (2013.01)

(58) Field of Classification Search
CPC ............. H04W 52/346; H04W 52/46; H04W 52/367; H04W 52/48; H04W 52/322
See application file for complete search history.

(56) References Cited

U.S. PATENT DOCUMENTS

| 2004/0063433 A1* | 4/2004 | Garrison ................... 455/447 |
| 2008/0037413 A1* | 2/2008 | Gu et al. .................... 370/210 |
| 2008/0045260 A1* | 2/2008 | Muharemovic et al. ..... 455/522 |

(Continued)

FOREIGN PATENT DOCUMENTS

| EP | 1734669 A2 | 12/2006 |
| JP | 2009049938 A | 3/2009 |

(Continued)

OTHER PUBLICATIONS

International Preliminary Report on Patentability for International application No. PCT/US2010/032198 dated Nov. 3, 2011.

(Continued)

*Primary Examiner* — Andrew Chriss
*Assistant Examiner* — Salvador E Rivas
(74) *Attorney, Agent, or Firm* — Carlson, Gaskey & Olds, P.C.

(57) ABSTRACT

An exemplary method of communicating includes a relay node that uses a cell identifier that is also used by a base station having a coverage area within which the relay node is located. The method includes determining that a mobile station is within a communication range of the relay node. A transmission power from the relay node is controlled so that the total transmission power of at least one transmission from the relay node and the base station corresponds to a selected transmit power limit. A timing of a downlink transmission from the base station and the relay node is coordinated based on a schedule determined by the base station. At least one uplink control parameter is set at the base station based upon uplink information regarding a link between the mobile station and the relay node.

20 Claims, 7 Drawing Sheets (56) References Cited

U.S. PATENT DOCUMENTS

| | | | |
|---|---|---|---|
| 2008/0108304 A1 | 5/2008 | Suga | |
| 2008/0144562 A1 | 6/2008 | Draper et al. | |
| 2008/0214182 A1* | 9/2008 | Wang et al. | 455/423 |
| 2009/0168800 A1* | 7/2009 | Leinonen et al. | 370/464 |
| 2009/0279480 A1* | 11/2009 | Rosenqvist et al. | 370/328 |
| 2010/0254301 A1* | 10/2010 | Blankenship et al. | 370/315 |

FOREIGN PATENT DOCUMENTS

| | | | |
|---|---|---|---|
| WO | 2004107693 A1 | 12/2004 | |
| WO | 2007064249 A1 | 6/2007 | |
| WO | 2008084371 A2 | 7/2008 | |
| WO | 2008105620 A1 | 9/2008 | |

OTHER PUBLICATIONS

R1-091632, Type II Relay Frame-Work Definition, Vodafone, CMCC, CHTTL, Alcatel-Lucent, Alcatel-Lucent Shanghai Bell, CATT, ITRI, HTC, ZTE, Potevio, Huawei, InterDigital, Mitsubishi Electric, Ericsson.

R1-091462, PUCCH Transmit Diversity, Source: Qualcomm Europe, 3GPP TSG-RAN WG1 #56bis, Mar. 23-27, 2009, Seoul, Korea, pp. 1-8.

R1-091152, Layer 2 Relay Functionality, Source: Research in Motion, UK Limited, 3GPP TSG RAN WG1, Meeting #56bis, Seoul Korea, Mar. 23-27, 2009, pp. 1-4.

R1-091403, Further Consideration on L2 Transparent Relay, Source: Vodafone, 3GPP TSG-RAN WG1 #56bis, Seoul, Korea, Mar. 23-27, 2009, 7 pages.

R1-091423, Comparison of Type 1 Relay and L2 Cooperative Relay, Source: ZTE, TSG-RAN WG1 #56bis, Seoul, Korea, Mar. 23-Mar. 27, 2009, pp. 1-10.

R1-091572, Cost Aspects of Relay Deployments and Impact on Evaluation Scenarios, Source: Orange, TSG-RAN WG1 #56bis, Seoul, Korea, Mar. 23-27, 2009, 3 pages.

R1-090775, TDMA H-ARQ Code for Layer-2 Relay in LTE-Advanced, Source: Alcatel-Lucent, 3GPP TSG RAN WG1 Meeting #56, Athens, Greece, Feb. 9-13, 2009, 5 pages.

R1-091112, Text Proposal on Type 1 Relaying, Source: Ericsson, TSG-RAN WG1 Meeting #56, Athens, Greece, Feb. 9-13, 2009, 2 pages.

R1-091361, Text Proposal for 36.814 on Access-Backhaul Partitioning of Relays, Source: Nokia, Nokia Siemens Networks, 3GPP TSG RAN WG1 Meeting #56bis, Seoul, Korea, Mar. 23-27, 2009, 2 pages.

International Search Report and Written Opinion of the International Searching Authority for International application No. PCT/US2010/032198 mailed Aug. 6, 2010.

"Third Generation Partnership Project; Technical Specification Group Radio Access Network; Further Advancements for E-UTRA Physical Layer Aspects (Release 9)" 3GPP Standard; 3GPP TR 36.814, 3rd Generation Partnership Project (3GPP), Mobile Competence Centre; 650, Route Des Lucioles; F-06921 Sophia-Antipolis Cedex; Frances, No. VO.4.1, Feb. 1, 2009, pp. 1-31, XP050380817, pp. 8-10.

* cited by examiner

METHOD AND APPARATUS FOR POWER CONTROL AND INTERFERENCE COORDINATION

CROSS REFERENCE TO RELATED APPLICATIONS

This application claims priority to U.S. Provisional Application Ser. No. 61/214,508, which was filed on Apr. 24, 2009.

BACKGROUND

1. Field of the Invention

This invention generally relates to communication. More particularly, this invention relates to power control and interference coordination techniques in communications.

2. Description of the Related Art

Wireless communication systems are well known and in widespread use. Various system configurations are currently in use. Additional system configurations have been under investigation for some time. One such system currently under development is the long term evolution (LTE) system. As the LTE system is being developed, those skilled in the art are considering various ways to enhance mobile communications on behalf of users.

One area of investigation has been to provide relay nodes that effectively extend the communication capabilities of a base station (eNodeB). The so-called Type I relay node has its own physical cell identifier. The Type 1 relay nodes effectively create their own cell and coverage area. The so-called Type II relay node does not have its own physical cell identifier. The Type II relay nodes relay information implicitly to a mobile station or user equipment (UE). Suggested relay technologies for the implicit relaying of information include amplify-and-forward, decode-and-forward, compress-and-forward among other joint coding schemes.

While such arrangements have been under investigation, there is a need to develop systems and techniques for facilitating the operation of such relay nodes. The following discussion provides example control techniques intended for use with Type II relay nodes.

SUMMARY

An exemplary method of communicating includes a relay node that uses a cell identifier that is also used by a base station having a coverage area within which the relay node is located. The method includes determining that a mobile station is within a communication range of the relay node. A transmission power from the relay node is controlled so that the total transmission power of at least one transmission from the relay node and the base station corresponds to a selected transmit power limit. A timing of a downlink transmission from the base station and the relay node is coordinated based on a schedule determined by the base station. At least one uplink control parameter is set at the base station based upon uplink information regarding a link between the mobile station and the relay node.

The various features and advantages of disclosed examples will become apparent to those skilled in the art from the following detailed description. The drawings that accompany the detailed description can be briefly described as follows.

DETAILED DESCRIPTION

Figure 1:
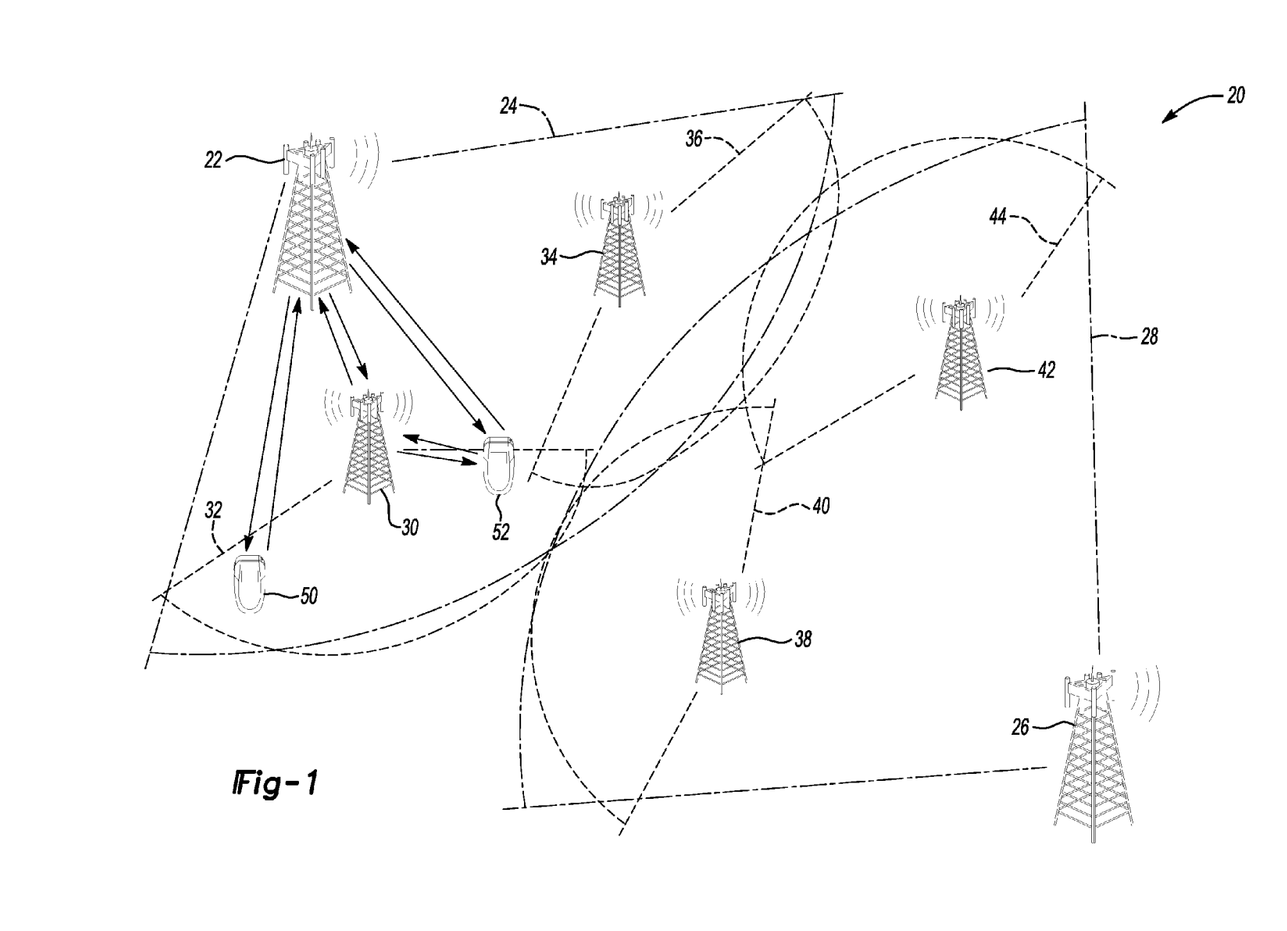
FIG. 1 schematically illustrates selected portions of an example communication system.

FIG. 1 schematically illustrates selected portions of an example communication system 20. For purposes of discussion, the example system 20 is capable of operating using LTE technology. A base station (eNodeB) 22 provides wireless communication capability within a coverage area 24. Another base station 26 provides a coverage area 28.

The example of FIG. 1 includes a plurality of relay nodes that are configured as Type II relay nodes capable of operating using LTE technology. A relay node 30 provides a coverage area 32. In this example, the relay node 30 is within the coverage area 24 of the base station 22. The coverage area 32 provided by the relay node 30 is almost entirely within the coverage area 24 in this example. Another relay node 34 provides a coverage area 36 that has significant overlap with the coverage area 24.

Additional relay nodes are provided within the coverage area 28 of the base station 26. The illustrated example includes a relay node 38 having a coverage area 40 and another relay node 42 having a coverage area 44.

Each of the relay nodes facilitates communication between a mobile station and the base station having the coverage area within which the relay node is located. The relay nodes 30 and 34 facilitate communication between mobile stations and the base station 22. In the example of FIG. 1, the relay node 30 is facilitating communications between a mobile station 50 and the base station 22 and facilitating communications between a mobile station 52 and the base station 22. The relay nodes 34, 38 and 42 are not currently servicing any mobile stations in the illustration of FIG. 1.

As can be appreciated from FIG. 1, uplink and downlink communications occur between the base station 22 and the mobile station 50, for example. This is because the mobile station 50 is within the coverage area 24. Uplink and downlink communications also occur between the mobile station 50 and the relay node 30. Uplink and downlink communications occur between the base station 22 and the relay node 30. The presence of the relay node 30 in closer proximity to the mobile station 50 facilitates enhanced communications between the mobile station 50 and the base station 22 because the relay node 30 relays communications between the mobile station 50 and the base station 22. For example, the relay node 30 receives communications from the base station 22 and forwards or relays them to the mobile station 50. The relay node 30 also receives communications from the mobile station 50 and forwards or relays them to the base station 22.

The relay nodes 30, 34, 38 and 42 are strategically positioned within the respective coverage areas of the associated base stations to provide a clear line of sight between each relay node and the associated base station for consistently reliable communications along the links between them. In the illustrated example, communications between the relay nodes and the base stations occur over wireless links.

The example of FIG. 1 includes relay nodes that provide cooperative Type II relay operation. In this example, the relay nodes do not have their own cell identifier. Instead, they use the same cell identifier as the base station having the coverage area within which the relay node is located. In this way, the relay nodes are effectively transparent to the mobile stations. The relay nodes in the example of FIG. 1 are considered to provide cooperative Type II relay operation because each relay node services mobile stations that are within a communication range of the relay node and within the coverage area of the associated base station.

Figure 2:
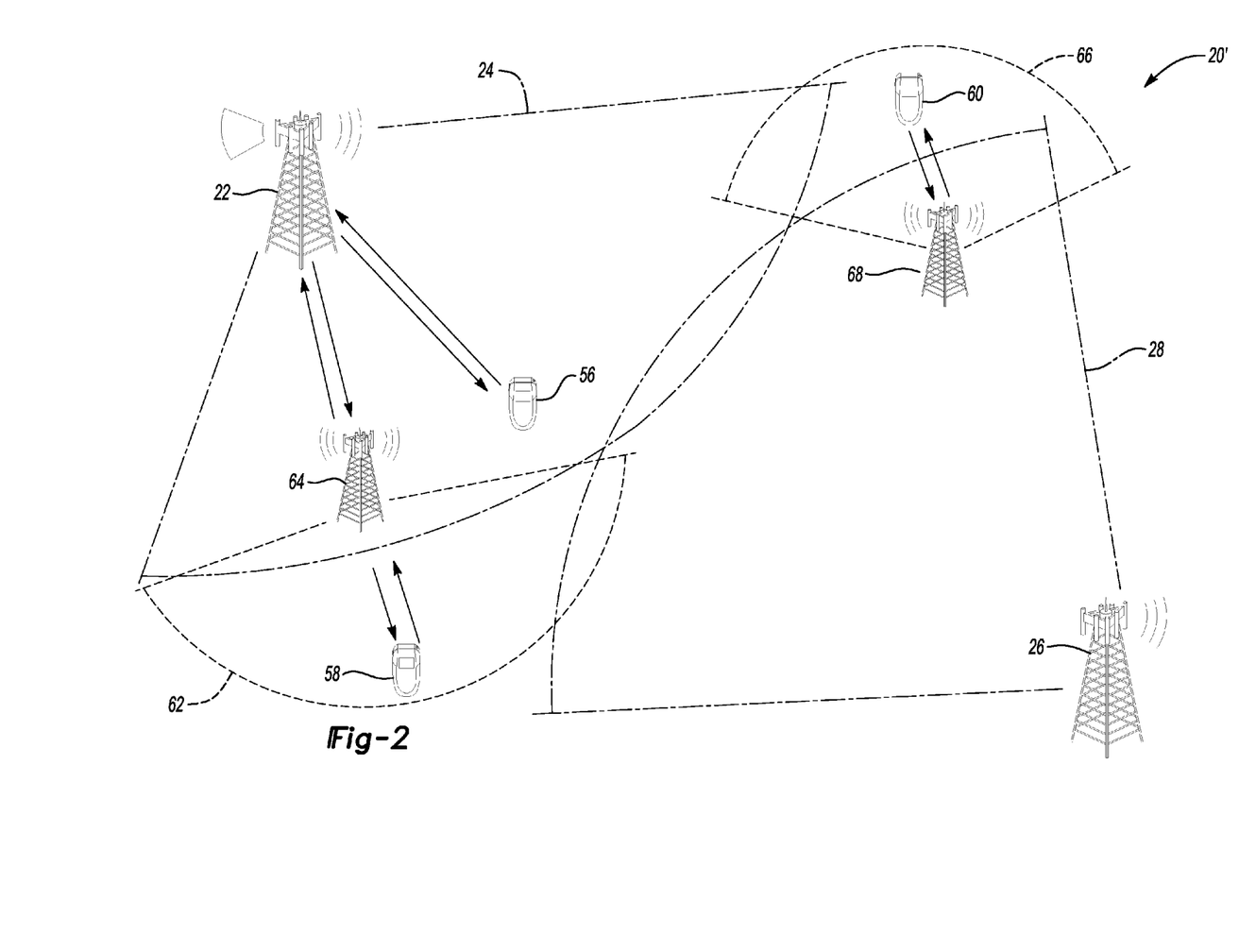
FIG. 2 schematically illustrates selected portions of another example communication system.

FIG. 2 illustrates another example system configuration 20'. This example includes mobile stations 56, 58 and 60 and the base stations 22 and 26. The example mobile station 56 is outside of the communication range of any of the relay nodes and it only communicates directly with the base station 22. The mobile station 58 is within a coverage area 62 of a relay node 64 and communicates through the relay node 64 with the base station 22. The mobile station 58 in this example is outside the coverage area 24 of the base station 22. The relay node 64, therefore, provides non-cooperative Type II relay operation. The communication between the relay node 64 and the mobile station 58 occurs without the mobile station 58 receiving signals directly from the base station 22.

The mobile station 60 is similarly situated to the mobile station 58. The mobile station 60 in this example is within a coverage area 66 of a relay node 68 that is located near an edge of the coverage area 28. The mobile station 60 as shown in FIG. 2 is outside of the coverage area 28 of the base station 26. Therefore, the relay node 68 in this example would be considered to be providing non-cooperative Type II relay operation.

Figure 3:
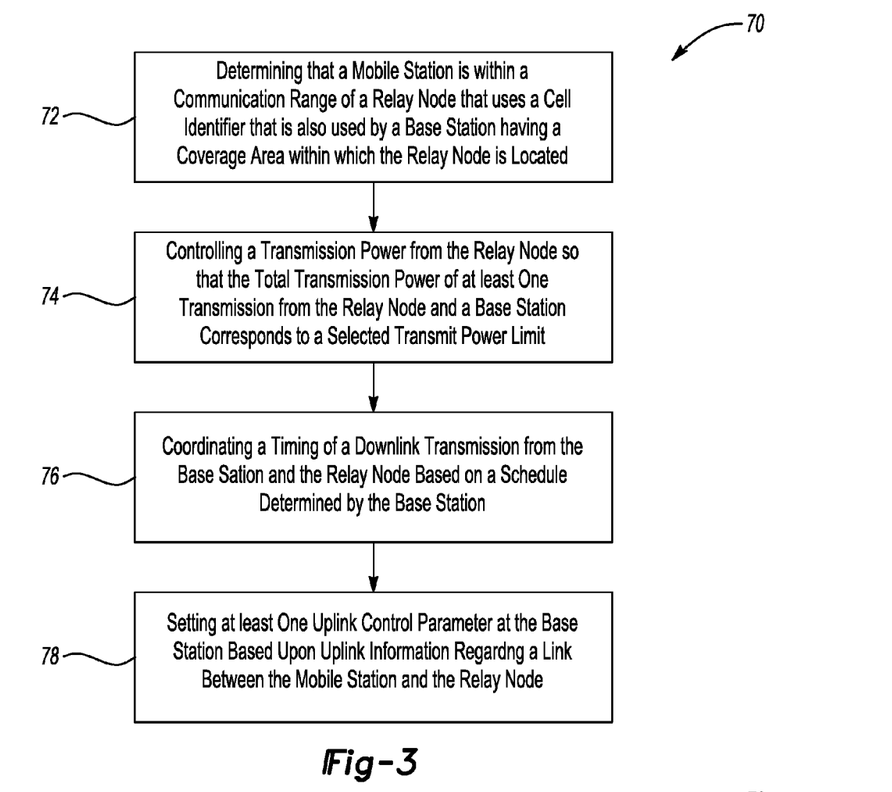
FIG. 3 is a flowchart diagram summarizing an example technique.

Regardless of whether cooperative or non-cooperative relay operation is required, it is necessary to control operation of the base stations and relay nodes to realize effective communications on behalf of the mobile stations. FIG. 3 includes a flowchart diagram 70 that summarizes one example approach. At 72, a determination is made that a mobile station is within a communication range of one of the relay nodes. At 74, a transmission power from the relay node is controlled so that the total transmission power of at least one transmission from the relay node and the associated base station corresponds to a selected transmit power limit. At 76, a timing of a downlink transmission from the base station and the relay node are coordinated based on a schedule determined by the base station. In the illustrated examples, the relay nodes do not have their own scheduler and they depend on a schedule set by the associated base station. At 78, at least one uplink control parameter is set at the base station based upon uplink information regarding a link between the mobile station of interest and the relay node involved in the communications.

For purposes of discussion, the base station 22, relay node 30 and mobile station 50 will be used to provide an example for discussing cooperative Type II relay operation. Communications (e.g., transmissions and reception) between the base station 22 and the relay node 30 are coordinated to maximize the performance in the uplink and downlink directions. The base station 22 and relay node 30 have collaborative transmission and reception within the overlapping coverage areas 24 and 32. The objective of cooperative Type II relay operation is to improve the downlink and uplink spectrum efficiency through cooperative transmissions and receptions between the relay node 30 and the base station 22.

The relay node 30 does not have its own cell identifier and, therefore, the mobile station 50 does not need to perform any type of handover procedure as it moves into the coverage area 32, for example. Coordination between the base station 22 and the relay node 30 is required within the overlapping coverage areas to achieve performance improvement. The type of coordination that is useful involves system configuration, operation, mobile station detection, downlink transmission and uplink reception.

Figure 4:
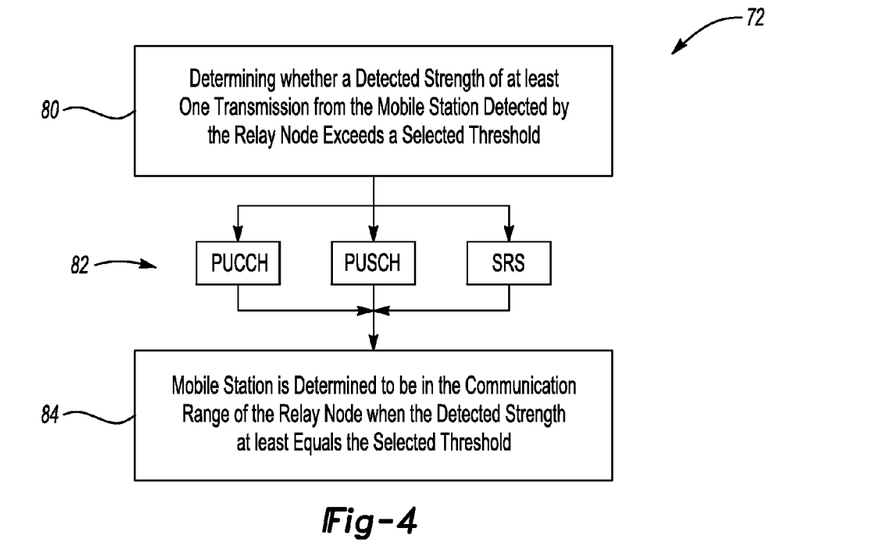
FIG. 4 is a flowchart diagram summarizing an example technique.

As indicated at 72 in FIG. 3, the determination is made that the mobile station 50 is within the coverage area 32 of the relay node 30. The flowchart in FIG. 4 summarizes one example technique for making that determination. At 80, a determination is made whether a detected strength of at least one transmission from the mobile station 50 as detected by the relay node 30 exceeds a selected threshold. As shown at 82, there are a variety of transmissions from the mobile station 50 that can be used for this purpose. One example includes detecting a physical uplink control channel (PUCCH) from the mobile station and determining whether a signal-to-interference ratio of such a signal as detected by the relay node 30 exceeds a selected threshold. Another example possibility includes a physical uplink shared channel (PUSCH). The signal-to-interference ratio on that channel can be compared to a corresponding predetermined threshold. Another example includes a sounding reference signal (SRS) from the mobile station. Any one of the example transmissions from the mobile station 50 can be compared to an appropriate threshold.

One example includes setting the appropriate threshold for mobile station detection by the relay node 30 at system initialization using information such as the relay node's coverage area and configuration within the overall system. The particular threshold for a given installation will be realized by those skilled in the art using known techniques. As indicated at 84, the mobile station is determined to be in the communication range of the relay node 30 when the detected strength of the selected signal or signals from the mobile station 50 at least equal the selected threshold.

Figure 5:
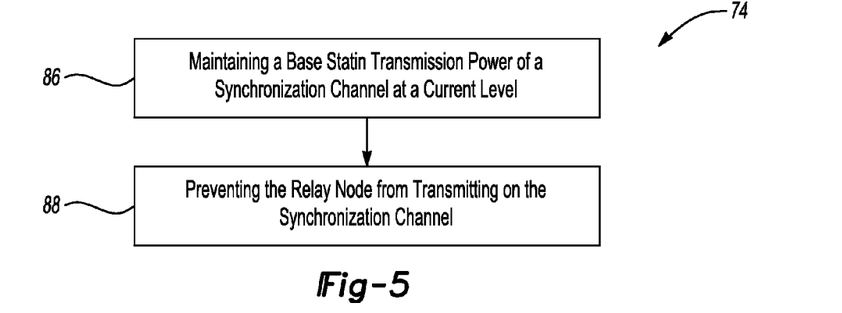
FIG. 5 is a flowchart diagram summarizing an example technique.

Once the determination is made that the mobile station is within the communication range or coverage area 32 of the relay node 30, it is necessary to coordinate communications between the base station 22, relay node 30 and mobile station 50. One aspect of that coordination includes controlling the transmission power from the relay node as shown at 74 in FIG. 3. One example technique for doing that is shown in the flowchart diagram of FIG. 5. For some signals from the base station, it will be desirable to maintain the base station transmit power at a current level that the base station is using before the mobile station 50 enters the coverage area 32. As shown at 86 in FIG. 5, the base station transmission power of a synchronization channel is maintained at such a current level. At 88, the relay node 30 is prevented from transmitting on the synchronization channel. In other words, the example at FIG. 5 involves null transmission of synchronization channels at the relay node 30.

Controlling downlink transmission power is necessary to maintain the intended coverage area of the base station 22 and relay node 30 while also controlling inter-cell interference to other cells, especially for a physical data shared channel (PDSCH) to other cells. In one example, this is achieved by maintaining the sum of the downlink transmission power from the base station 22 and the relay node 30 in the reference signal, control channels, synchronization channels and downlink shared channels the same as the transmission power of the base station 22 alone. The mobile station 50 performs a cell search dependent on the coordination of the transmission power on the synchronization channel, for example. Utilizing a coordinated power distribution between the base station 22 and the relay node 30 in the synchronization channel facilitates known mobile station cell searching techniques. That is why the null transmission of the synchronization channel from the relay node 30 is used in the example of FIG. 5.

The same principle applies in one example for the cell-specific reference signal and other control channels. The power distribution of the PDSCH between the base station 22 and the relay node 30 depends on several factors used for performance optimization. Example factors include the location of the relay node 30, which impacts path loss factors to the mobile station 50 from the base station 22 and the relay node 30. Another factor that is considered is whether joint encoding, progressive encoding or independent encoding is used by the relay node 30. Another factor to consider is the feedback scheme, which may be, for example, joint feedback, parallel feedback or single feedback based on cell-specific reference signals alone.

Figure 6:
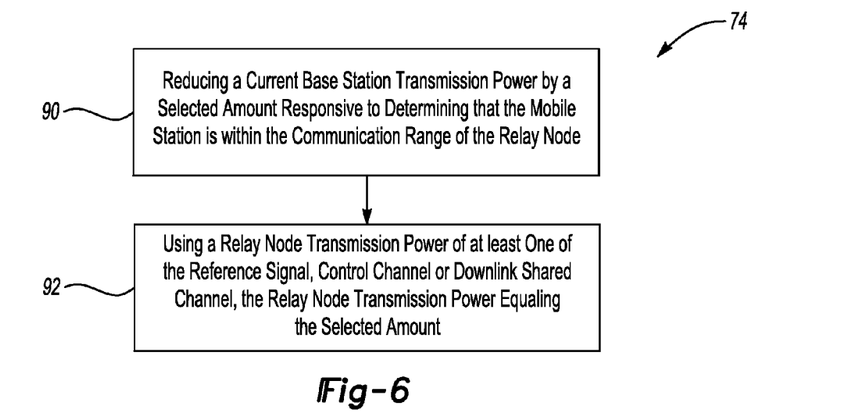
FIG. 6 is a flowchart diagram summarizing an example technique.

The flowchart diagram of FIG. 6 summarizes an example in which a current base station transmission power for a selected signal or on a selected channel is reduced by a selected amount at 90. At 92, the relay node transmission power of the at least one reference signal, control channel or downlink shared channel is set to equal the amount by which the base station transmission power was reduced. That way, the total power of transmission from the relay node and the base station 22 remains the same as that used by the base station 22 alone prior to cooperation with the relay node 30 to avoid inter-cell interference.

Another area in which coordination occurs is for scheduling decisions and resource allocation. In the cooperative Type II relay operation, the base station 22 has a scheduler and the relay node 30 does not. Because there is no scheduler at the relay node 30, cooperative transmission requires communicating scheduling information from the base station 22 to the relay node 30 in advance of a scheduled transmission. In other words, the timing of a downlink transmission from the base station 22 and the relay node 30 is based on a schedule determined by the base station. This is shown at 76 in FIG. 3.

Figure 7:
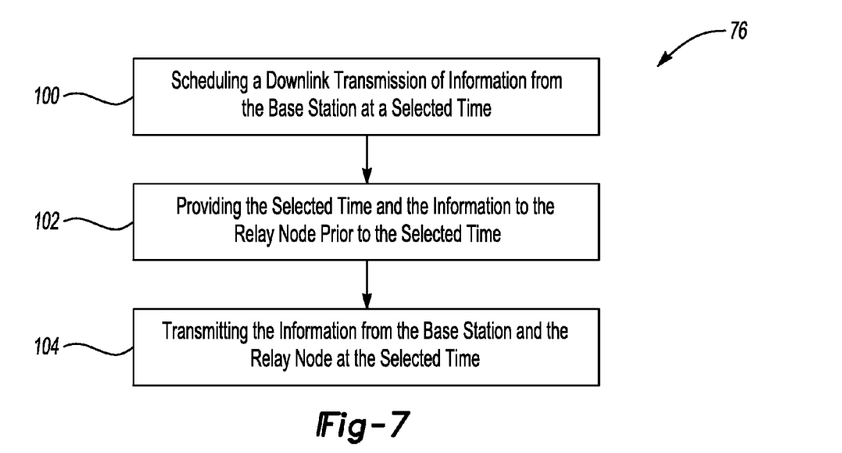
FIG. 7 is a flowchart diagram summarizing an example technique.

One example way of implementing such scheduling is shown in the flowchart diagram of FIG. 7. At 100, a downlink transmission of information from the base station is scheduled at a selected time. At 102, the selected time and the information is provided to the relay node prior to the selected time. At 104, the information is transmitted from the base station and the relay node at the selected, scheduled time.

Another aspect of the coordination between the base station 22 and the relay node 30 facilitates uplink reception. For example, the relay node 30 takes advantage of the superior radio link between the relay node 30 and the mobile station 50 (compared to that between the base station 22 and the mobile station 50) to assist the base station 22 in uplink signal processing in order to improve the data rate in the coverage area 32. The relay node 30 provides uplink information regarding the link between the mobile station 50 and the relay node 30 to the base station 22. At least one uplink control parameter is set by the base station 22 based upon that uplink information.

In one example, once the relay node 30 detects that the mobile station 50 is within its coverage area 32 and reports to the base station 22, the relay node 30 performs channel state estimation from the sounding reference signal (SRS) transmission from the mobile station 50. The relay node 30 estimates the channel state information from the UL signals transmitted by mobile station 50 and then provides that to the base station 22.

Figure 8:
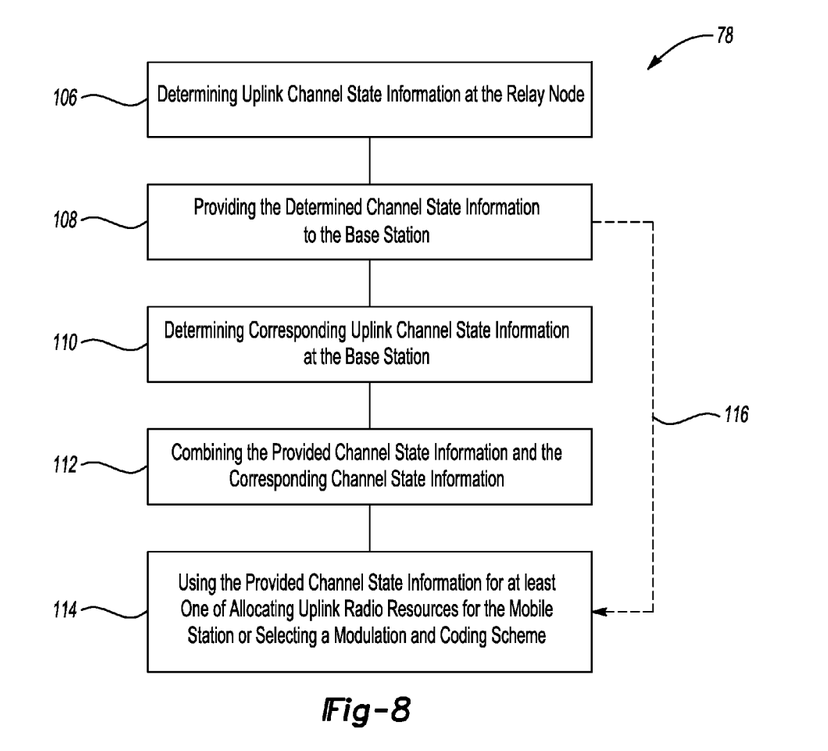
FIG. 8 is a flowchart diagram summarizing an example technique.

The cooperative Type II relay operation also involves a relatively smaller path loss in the link between the relay node 30 and the mobile station 50. This allows the relay node 30 to assist the base station 22 for setting up a proper control parameter for uplink power control. This also allows the relay node 30 to assist the base station 22 for selecting a modulation and coding scheme to optimize the uplink performance. One example technique is shown in the flowchart of FIG. 8. At 106, uplink channel state information is estimated at the relay node 30. That information is then provided to the base station at 108. In the example of FIG. 8, the base station 22 determines corresponding uplink channel state information at 110. At 112, the base station 22 combines the channel state information provided by the relay node 30 and the corresponding uplink channel state information estimated at the base station 22. The channel state information is then used at 114 for at least one of allocating uplink radio resources for the mobile station 50 or selecting a modulation and coding scheme.

As schematically shown at 116 in FIG. 8, some examples include allocating uplink radio resources or selecting a modulation and coding scheme based only on the channel state information provided by the relay node 30 without requiring the base station 22 to determine its own channel state information. In other words, the illustrated steps 110 and 112 may be left out of some example implementations.

In one example, the scheduling strategy involves selecting the modulation and coding scheme based on the channel state information of the link between the mobile station 50 and the relay node 30 to maximize the data throughput when the mobile station 50 is within the coverage area 32. In general, the radio channel between the base station 22 and the mobile station 50 will be worse than that between the relay node 30 and the mobile station 50. This allows the relay node 30 to decode uplink data successfully before the base station 22 will be able to decode the same information provided by the mobile station 50. Accordingly, the relay node 30 in this example forwards successfully decoded packets to the base station 22. Using a decode-and-forward scheme allows the relay node 30 to decode each uplink data transmission from the mobile station 50 and forward that to the base station 22. The modulation and coding scheme selection and uplink resource allocation of the data transport in the link between the base station 22 and the relay node 30 in one example is determined based on the channel state information from the mobile station 50 in the decode-and-forward scheme. A compress-and-forward scheme involves selecting the modulation and coding scheme and resource allocation of the aggregate traffic from multiple mobile stations in the data transport protocol of the link between the relay node 30 and the base station 22.

Another feature of the illustrated example is that it provides downlink access control that includes configuration of synchronization channels PBCH, PDCCH and PHICH. The primary and secondary synchronization channels are used by the mobile station 50 during initial cell search. The PBCH contains the master information block of the broadcast information for the mobile station 50 to access the system. The PDCCH contains downlink and uplink scheduling information. All downlink access control channels are confined by the coverage issues similar to reference signal design. As mentioned above, when the mobile station 50 is within the coverage area 24 of the base station 22, the relay node 30 does not transmit control information. In other words, the synchronization channels PBCH, PDCCH and PHICH are only transmitted from the base station 22. The mobile station 50 will access the downlink control channel information in the same way as if the relay node 30 did not exist. Such an example simplifies the coordination of downlink access control and implicitly supports Release-8 mobile stations. With the disclosed example, there is no requirement to configure MBSFN sub-frames at the access link for faking no transmission for relay node reception from the base station 22, for example.

Another feature of the disclosed example is reference signal design to support the cooperative Type II relay operation. The reference signal transmission power in this example is coordinated to maintain the same coverage area as schematically shown in FIG. 1. When the mobile station 50 is within the coverage area 24, the same transmit power of the base station 22 cell-specific reference signal is used as if the relay node 30 were not there or the mobile station 50 were not inside of the coverage area 32 of the relay node 30. In other words, there is no transmission of the cell-specific reference signal from the relay node 30 in this example. Reference signal transmission from the base station 22 alone allows the mobile station 50 to perform the same RSRP/RSRQ measurements and handover procedures as used in the E-UTRAN system without any relay nodes.

The mobile station 50 utilizes the cell-specific reference signal to measure CQI/PMI/RI and to report those measurements back to the base station 22. Given that only the base station 22 provides the cell-specific reference signal in this example, the CQI/PMI/RI measurement does not include desired channel state information feedback of the cooperative transmission from the base station 22 and the relay node 30. In this example, the channel state information feedback for joint transmission from the base station 22 and relay node 30 involves the mobile station 50 measuring the channel state information from the reference signal during joint PDSCH transmission. In one example, the CSI information of the joint transmission is fed back through asynchronous CQI/PMI/RI report mechanisms through the PUSCH. This example approach allows the downlink scheduler of the base station 22 to collect a desired channel state information for resource allocation, modulation and coding scheme decisions and transmission mode selection for joint transmission from the base station 22 and the relay node 30.

Figure 9:
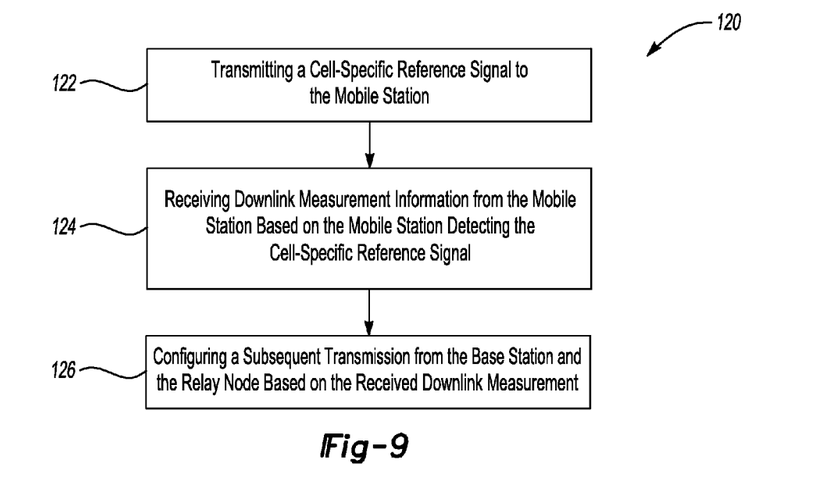
FIG. 9 is a flowchart diagram summarizing an example technique.

FIG. 9 includes a flowchart diagram 120 that summarizes an example approach for downlink access control. At 122, the cell-specific reference signal is transmitted to the mobile station. In the case of coordinated Type II relay operation, only the base station provides the cell-specific reference signal to the mobile station. At 124, downlink measurement information is received from the mobile station based upon the mobile station detecting the cell-specific reference signal. At 126, a subsequent transmission from the base station 22 and the relay node 30 is configured by the base station 22 based on the received downlink measurement from the mobile station 50.

Figure 10:
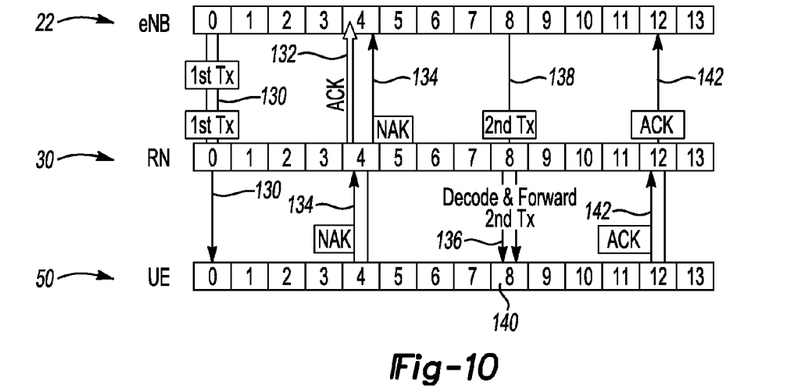
FIG. 10 schematically illustrates a hybrid automatic repeat request technique that is useful with an example embodiment.

Another feature of the example arrangement is that it facilitates hybrid automatic-repeat-request (HARQ) operation. This example includes a decode-and-forward operation. Referring to FIG. 10, the base station 22 transmits a first downlink HARQ packet to the relay node 30 and the mobile station 50. This is shown at 130 in FIG. 10. The relay node 30 and the mobile station 50 receive this first packet. The example cooperative Type II decode-and-forward scheme allows the relay node 30 to decode this first transmission correctly by taking advantage of the superior and static radio channel condition of the link between the base station 22 and the relay node 30. As shown at 132, the relay node 30 sends an acknowledgment (ACK) back to the base station 22 using the control channel of the C-plane protocol link between the base station 22 and the relay node 30. It is expected that the mobile station 50 will not successfully decode the first HARQ transmission from the base station 22. Therefore, as schematically shown at 134, the mobile station 50 sends a negative acknowledgement (NAK) to the relay node 30 and the base station 22.

The relay node 30 has now successfully decoded the first transmission 130 from the base station 22. As shown at 136, the relay node 30 re-encodes and forwards the first HARQ packet to the mobile station 50 as shown at 136. At approximately the same time, the base station 22 sends a second HARQ transmission at 138, which is a retransmission of the first packet in response to the NAK from the mobile station 50. At 140, the mobile station 50 receives a superposition of the retransmission packet from the base station 22 and the re-encoded transmission from the relay node 30. Given that the resource allocation and scheduling decisions are primarily based on the channel state information of the link between the mobile station 50 and the relay node 30 in this example, the probability of successfully decoding the transmission of packets in the HARQ decoding is very high at the point schematically shown at 140. Accordingly, the mobile station 50 can terminate the HARQ decoding earlier and obtain early termination gains using the cooperative Type II relay operation. As shown at 142, the mobile station 50 provides an ACK to the relay node 30 and base station 22.

According to the example of FIG. 2, the relay node 30 does not forward the first HARQ packet transmission to the mobile station 50 until the time that the base station 22 is sending the second transmission of the HARQ packet.

Figure 11:
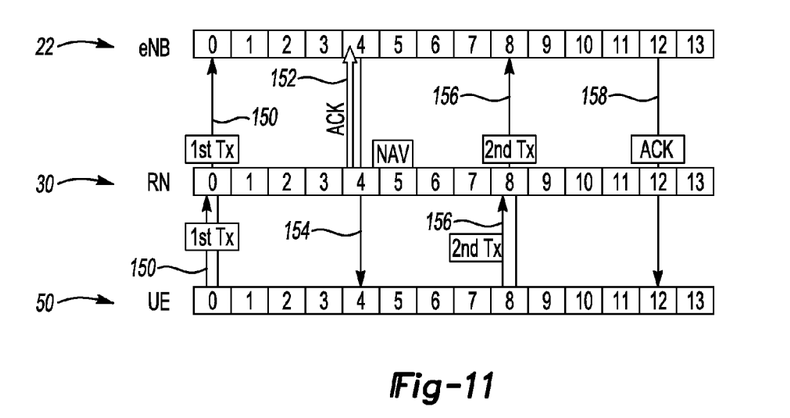
FIG. 11 schematically illustrates a hybrid automatic repeat request technique that is useful with an example embodiment.

While FIG. 10 schematically illustrates a downlink HARQ approach, FIG. 11 schematically illustrates uplink HARQ processing and timing. Given the superior link quality between the relay node 30 and the mobile station 50, it is likely that the relay node 30 will successfully decode uplink transmissions from the mobile station 50 before the base station 22 is able to do that. The relay node 30 forwards appropriate information regarding that successful decoding to the base station 22.

As shown at 150, the mobile station 50 provides a first HARQ packet to the relay node 30 and the base station 22. In this example, the relay node 30 successfully decodes that packet and sends an ACK to the base station 22 as shown at 152. This is sent through the control channel of the link between the base station 22 and relay node 30, for example. The base station 22, on the other hand, could not successfully decode the transmission shown at 150. Accordingly, the base station 22 sends a NAK at 154 to the mobile station 50. This occurs because the base station 22 sends either an ACK or NAK as feedback to the mobile station three milliseconds after reception of the uplink packet. In the illustrated example, the ACK from the relay node 30 is sent to the base station 22 at the same time that the base station 22 sends the NAK to the mobile station 50.

As shown at 156, the mobile station 50 retransmits the HARQ packet in response to the NAK from the base station 22. The mobile station 50 does not recognize the relay node 30 as a separate node because the relay node 30 uses only the cell identifier of the base station 22. It is useful to provide the ACK at 152 from the relay node 30 only to the base station 22. If the mobile station 52 were to receive an ACK from the relay node 30, that would conflict with the NAK received as shown at 154 from the base station 22. This would potentially create a problem for processing at the mobile station 50. As shown at 158, the base station 22 provides an ACK to the mobile station 50 based upon the ACK 152 from the relay node 30.

The example of FIG. 11 demonstrates how the relay node 30 decodes the HARQ packet successfully and forwards it to the base station 22. If the relay node 30 did not successfully decode the packet, it could also forward channel compensated soft bits to the base station 22 for IR combining with the next retransmission from the mobile station 50. Even under this condition, the cooperative Type II relay assists the base station 22 for more quickly terminating the HARQ operation.

Referring back to FIG. 2 and using the mobile station 60 and relay node 68 as an example, when the mobile station 60 is outside of the coverage area 28 of the base station 26, the relay node 68 provides non-cooperative Type II relay operation. In this example, the relay node 68 relays information to the mobile station 60 without joint transmission or reception between the base station 26 and the mobile station 60. This is because the mobile station 60 is not able to detect or receive signals from the base station 26 when it is outside of the coverage area 28. As schematically shown in the drawing, the coverage area 66 of the relay node 68 effectively extends the coverage area of the base station 26. The relay node 68 does not have its own cell identifier and the mobile station 60 considers the relay node 68 as if it were the base station 26. In other words, the mobile station 60 cannot draw any distinction between the relay node 68 and the base station 26.

The non-cooperative Type II relay operation provides implicit coverage extension without cell planning and without requiring any handover support. The relay node 68 is positioned to extend the coverage outside the coverage area 28 of the base station 26 by receiving downlink information from the base station 26 and forwarding that onto the mobile station 60. The relay node 68 also receives uplink information from the mobile station 60 and forwards or relays that to the base station 26. The relay node 68 in this example decodes uplink information from the mobile station 60 prior to forwarding that to the base station 26.

Given that the coverage areas of the base station 26 and the relay node 68 effectively do not overlap for a significant portion of the coverage area 66, there is no requirement for coordination between the relay node 68 and the base station 26 as there was between the relay node 30 and the base station 22 as described above. There still is, however, a requirement for information exchange between the base station 26 and the relay node 68 to achieve effective system operation.

As shown at 72 in FIG. 3, the relay node 68 determines that the mobile station 60 is within communication range of the relay node. This can be accomplished in the same manner that the relay node 30 determined that the mobile station 50 was within its coverage area as summarized in the flowchart of FIG. 4, for example. The relay node 68 informs the base station 26 regarding the presence of the mobile station 60.

Even though the mobile station 60 is only communicating directly with the relay node 68, there is no scheduler at the relay node 68. In this example, the base station 26 scheduler provides scheduling decision and resource allocation information for the mobile station 60 through a newly defined control channel of the interface between the base station 26 and the relay node 68 at least one sub-frame in advance of the time selected for a scheduled transmission to the mobile station 60. In one example, the base station 26 and the relay node 68 both transmit the PDCCH at the same time for any mobile stations to receive it when they are in the respective coverage areas.

As shown at 74 in FIG. 3, transmission power from the relay node 68 is controlled to correspond to a selected transmit power limit In this example, the mobile station 60 is not able to receive control signaling from the base station 26. Therefore, unlike the example of FIG. 1, there is no concern with having only the base station transmit synchronization channel or control information. On the contrary, this example requires the relay node 68 to transmit synchronization channel and control information to the mobile station 60. No coordination of transmission power between the relay node 68 and the base station 26 is required. The transmit power used by the relay node 68 is tuned based upon the desired coverage area configuration as schematically shown at 66.

In the example of FIG. 2 using non-cooperative Type II relay operation, the relay node 68 provides channel state information of the radio link between the mobile station 60 and the relay node 68 to the base station 26 so that the base station scheduler can perform radio resource allocation and select a modulation and coding scheme. Measurements from the mobile station 60 for CQI/PMI/RI reports are based on the cell-specific reference signal that is transmitted by the relay node 68. The CQI/PMI/RI reports from the mobile station 60 are received by the relay node 68 and then forwarded to the base station 26 through the control channel link between them.

As shown at 78 in FIG. 3, uplink channel control parameters are set based upon the relay node 68 obtaining channel state information from the mobile station. One example includes the relay node 68 detecting the sounding reference signal (SRS) from the mobile station 60 on a continuous basis. The uplink scheduler at the base station 26 uses the channel state information estimation for the link between the relay node 68 and the mobile station 60 to determine the uplink radio resource allocation and the modulation and coding scheme to facilitate communications between the relay node 68 and the mobile station 60. Uplink power control is set by the base station 26 based upon the path loss in the link between the relay node 68 and the mobile station 60 and based upon the coverage area 66 of the relay node 68.

Downlink access control in the non-cooperative example includes transmitting the synchronization channels, PBCH, PDCCH and PHICH from the relay node 68 and the base station 26 at the same time. The PSS/SSS for the mobile station initial cell search are fixed for each cell and in one example are configured in the relay node 68 without further communication from the base station 26. The master information block of the broadcast information contained in the PBCH does not need to change for most examples. If a change is required for the master information block, that information could be exchanged in advance through the control signaling between the base station 26 and the relay node 68. In other words, common control channels are transmitted together from the base station 26 and the relay node 68 in this example.

The reference signal transmission from the relay node 68 in one example occurs on a continuous basis with in-band TDM backhauling. This example does not require expensive antenna isolation because the cross-interference between the transmitting CRS and the received CRS is minimal in this example.

With the non-cooperative Type II relay information, the relay node 68 and the base station 26 transmit the cell-specific reference signal. The CRS can therefore be used for PDSCH demodulation in this example. Another feature of this example is that Release 8 mobile stations are implicitly supported because the relay node transmits the cell-specific reference signal.

Another feature of this example is that it supports HARQ processing and timing. One example includes a forward-then-transmit operation. The base station 26 sends a HARQ packet to the relay node 68 in advance of the time that the packet should be provided to the mobile station 60. This is shown at 170 in FIG. 12. At 172, the relay node 68 sends an ACK to the base station 26 through the control channel between them. This assumes that the relay node 68 successfully decoded the packet. Based upon scheduling information from the base station 26, the relay node 68 transmits the first downlink HARQ transmission at 174 to the mobile station 60.

Figure 12:
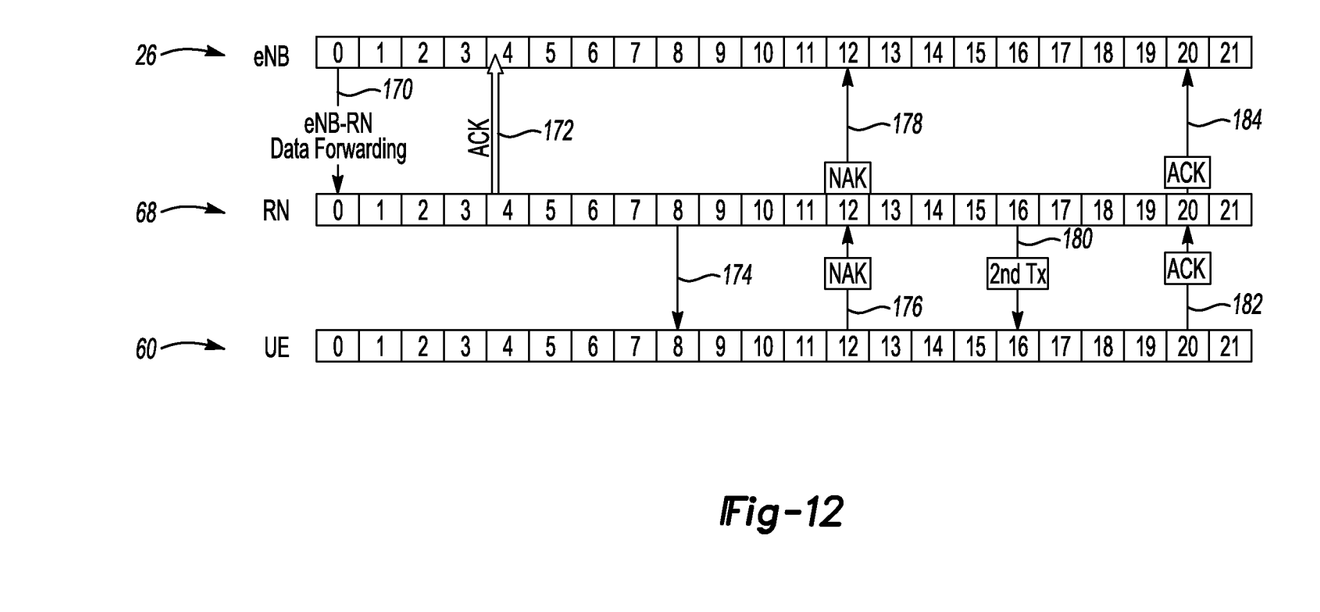
FIG. 12 schematically illustrates a hybrid automatic repeat request technique that is useful with an example embodiment.

The base station 26 may also transmit the first HARQ transmission at the same time but the mobile station 60 is outside of the coverage area 28 in this example so that it cannot receive such a transmission from the base station 26. At 176, the mobile station 60 sends a NAK to the relay node 68 that is then forwarded at 178 to the base station 26. In this particular example, the mobile station 60 was unable to decode the first HARQ transmission. At 180, the relay node 68 retransmits the packet based upon scheduling and resource allocation information from the base station 26. At 182, the mobile station 60 provides an ACK indicating that it successfully decoded the packet. The relay node 68 forwards the ACK at 184 to the base station 26.

Figure 13:
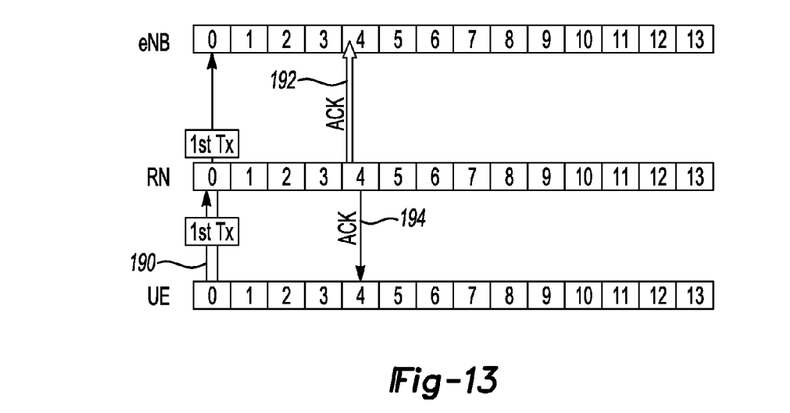
FIG. 13 schematically illustrates a hybrid automatic repeat request technique that is useful with an example embodiment.

As shown in FIG. 13, uplink HARQ processing in the non-cooperative Type II relay operation relies upon the relay node 68 to decode the uplink transmission successfully and then forward or compress-and-forward the information to the base station 26. As shown at 190, the mobile station 60 provides a first HARQ uplink transmission to the relay node 68. In FIG. 13 that same transmission is directed toward the base station 26 although it may not be able to receive it given the distance between the mobile station 60 and the base station 26. As shown at 192, the relay node 68 provides an ACK to the base station 26. At 194, the relay node 68 provides an ACK to the mobile station 60.

The preceding description demonstrates how power control and interference coordination techniques allow for implementing Type II relay node operation in a cooperative or non-cooperative manner. The relay nodes do not use their own physical cell identification but, instead, enhance the throughput near the edges of the cell of a base station. The coverage extension provided by the relay nodes facilitates enhanced communications beyond the capabilities of an arrangement that does not include such relay nodes.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating through a relay node that uses a cell identifier that is also used by a base station having a coverage area within which the relay node is located, comprising the steps of:
   (A) determining that a mobile station is within a communication range of the relay node;
   (B) controlling a transmission power from the relay node so that the total transmission power of at least one transmission from the relay node and the base station corresponds to a selected transmit power limit;
   (C) coordinating a timing of a downlink transmission from the base station and the relay node based on a schedule determined by the base station; and
   (D) setting at least one uplink control parameter at the base station based upon uplink information regarding a link between the mobile station and the relay node.

2. The method of claim 1, wherein step (A) comprises determining whether a detected strength of at least one transmission from the mobile station detected by the relay node exceeds a selected threshold.

3. The method of claim 2, wherein the at least one transmission from the mobile station comprises at least one of
   a transmission on a physical uplink control channel (PUCCH);
   a transmission on a physical uplink shared channel (PUSCH); or
   a sounding reference signal (SRS) transmission; and
   the mobile station is determined to be in the communication range of the relay node when the detected strength at least equals the selected threshold.

4. The method of claim 1, wherein the selected transmit power limit corresponds to a transmit power used by the base station before the mobile station was within the communication range of the relay node.

5. The method of claim 4, wherein step (B) comprises
   maintaining a base station transmission power of a synchronization channel at a current level; and
   preventing the relay node from transmitting on the synchronization channel.

6. The method of claim 1, wherein step (B) comprises
   reducing a current base station transmission power of at least one of a reference signal, a control channel or a downlink shared channel by a selected amount responsive to determining that the mobile station is within the communication range of the relay node; and
   using a relay node transmission power of the at least one of the reference signal, control channel or downlink shared channel, the relay node transmission power equaling the selected amount.

7. The method of claim 1, wherein step (C) comprises
   scheduling a downlink transmission of information from the base station at a selected time;
   providing the selected time and the information to the relay node prior to the selected time; and transmitting the information from the base station and the relay node at the selected time.

8. The method of claim 1, wherein step (D) comprises
determining uplink channel state information at the relay node;
providing the determined channel state information to the base station;
using the provided channel state information for at least one of allocating uplink radio resources for the mobile station or selecting a modulation and coding scheme.

9. The method of claim 8, wherein step (D) comprises
determining corresponding uplink channel state information at the base station; and
combining the provided channel state information and the corresponding channel state information for the at least one of the allocating uplink radio resources or the selecting the modulation and coding scheme.

10. The method of claim 1, comprising
transmitting a cell-specific reference signal from the base station as the only cell-specific reference signal provided to the mobile station from the base station and the relay node.

11. The method of claim 10, comprising
receiving downlink measurement information from the mobile station based on the mobile station detecting the cell-specific reference signal; and
configuring a subsequent transmission from the base station and the relay node based on the received downlink measurement information.

12. The method of claim 1, comprising
transmitting a downlink hybrid automatic-repeat-request (HARQ) packet from the base station to the relay node and the mobile station;
receiving a negative acknowledgment (NAK) from the mobile station at the base station and at the relay node;
retransmitting the HARQ packet to the mobile station from the base station; and
transmitting the HARQ packet to the mobile station from the relay node such that the mobile station receives the HARQ packet from the relay node approximately when the mobile station receives the retransmitted HARQ from the base station.

13. The method of claim 12, comprising
receiving an acknowledgement (ACK) from the mobile station at the relay node; and
communicating the received ACK to the base station from the relay node.

14. The method of claim 1, comprising
receiving an uplink hybrid automatic-repeat-request (HARQ) packet from the mobile station at the base station and the relay node;
transmitting a negative acknowledgment (NAK) from the base station to the mobile station if the base station does not successfully decode the HARQ;
communicating an acknowledgement (ACK) from the relay node to the base station indicating that the HARQ was successfully decoded at the relay node;
retransmitting the HARQ packet from the mobile station to the base station; and
transmitting an ACK to the mobile station from at least the relay node such that the mobile station no longer transmits the HARQ packet even if the base station has not successfully decoded the HARQ received directly from the mobile station.

15. The method of claim 1, wherein the mobile station receives transmissions from the relay node and the base station.

16. The method of claim 1, wherein the mobile station receives transmissions from the relay node when the mobile station is outside the coverage area of the base station.

17. The method of claim 1, wherein step (B) comprises
transmitting at least one control channel signal simultaneously from the relay node and the base station.

18. The method of claim 17, comprising
transmitting a cell-specific reference signal from the relay node that includes the cell identifier of the base station; and
controlling a transmit power used by the relay node for transmitting the cell-specific reference signal based on a coverage area of the relay node that extends outside of the coverage area of the base station.

19. The method of claim 1, wherein
hybrid automatic-repeat-request (HARQ) communications are received by the relay node from the base station and the mobile station, the HARQ communications are received by the mobile station only from the relay node and the HARQ communication are received by the base station only from the relay node.

20. The method of claim 1, comprising
receiving a first communication from the base station at the relay node;
relaying the first communication from the relay node to the mobile station;
receiving a second communication from the mobile station at the relay node; and
relaying the second communication from the relay node to the mobile station.

* * * * *